United States Patent [19]
Tyren

[11] Patent Number: 5,969,610
[45] Date of Patent: Oct. 19, 1999

[54] METHOD OF DETECTING LABELS WITH AMORPHOUS MAGNETO-ELASTICAL TAPES

[75] Inventor: Carl Tyren, Antibes, France

[73] Assignee: RSO Corporation N.V., Curacao, Netherlands

[21] Appl. No.: 08/823,412

[22] Filed: Mar. 25, 1997

Related U.S. Application Data

[63] Continuation of application No. PCT/SE95/01250, Oct. 23, 1995.

[30] Foreign Application Priority Data

Oct. 26, 1994 [SE] Sweden ................................. 9403676

[51] Int. Cl.$^6$ ................................................. G08B 13/14
[52] U.S. Cl. ................................ 340/572.1; 340/572.2; 340/572.4; 340/551
[58] Field of Search ........................... 340/551, 572, 340/825.54, 572.1, 572.4, 572.5, 572.6, 572.2; 324/207.11, 207.13, 207.22

[56] References Cited

U.S. PATENT DOCUMENTS

| | | | |
|---|---|---|---|
| 4,492,922 | 1/1985 | Ohkubo | 701/110 |
| 4,647,917 | 3/1987 | Anderson, III et al. | 340/572.4 |
| 4,704,602 | 11/1987 | Asbrink | 340/551 |
| 4,710,752 | 12/1987 | Cordery | 340/551 |
| 5,005,001 | 4/1991 | Cordery | 340/551 |
| 5,049,857 | 9/1991 | Plonsky et al. | 340/551 |
| 5,160,888 | 11/1992 | Laukien | 324/309 |
| 5,300,922 | 4/1994 | Stoffer | 340/572.1 |
| 5,397,986 | 3/1995 | Conway et al. | 324/243 |
| 5,420,569 | 5/1995 | Dames et al. | 340/572.6 |
| 5,551,158 | 9/1996 | Tyren et al. | 340/551 |
| 5,576,693 | 11/1996 | Tyren et al. | 340/572 |
| 5,621,316 | 4/1997 | Dames et al. | 324/207.13 |

FOREIGN PATENT DOCUMENTS

| | | | |
|---|---|---|---|
| 096 182 | 12/1983 | European Pat. Off. | 340/551 |
| 2167627 | 5/1986 | United Kingdom | 340/551 |
| 8801427 | 2/1988 | WIPO | 340/551 |
| WO 93/04538 | 3/1993 | WIPO | 340/551 |
| 9314478 | 7/1993 | WIPO | 340/551 |
| WO 93/14370 | 7/1993 | WIPO | 340/551 |
| 9529467 | 11/1995 | WIPO | 340/551 |
| WO 95/29467 | 11/1995 | WIPO | 340/572 |

*Primary Examiner*—Jeffery A. Hofsass
*Assistant Examiner*—Van T. Trieu
*Attorney, Agent, or Firm*—Merchant & Gould

[57] ABSTRACT

A method of detecting coded labels with at least two amorphous magneto-elastic tapes in a detection zone with a biasing magnetic field is described. The resonance frequencies and the modulation frequencies for each tape are detected at the same time. A tape whose detected resonance frequency is the same as the detected modulation frequency for another tape is registered as belonging to the same label. Further, the amplitude of the detected modulation frequencies of tapes belonging to the same label are detected to compute the angles between the tapes, which are part of the code.

2 Claims, 2 Drawing Sheets

METHOD OF DETECTING LABELS WITH AMORPHOUS MAGNETO-ELASTICAL TAPES

CROSS-REFERENCES TO RELATED APPLICATIONS

This is a continuation of PCT/SE95/01250 application filed Oct. 23, 1995.

BACKGROUND OF THE INVENTION

1. Field of the Invention

The present invention relates to a method of detecting labels present in a detection zone and exposed to a magnetic bias field in said zone, each label comprising a set of amorphous magneto-elastical strips, preferably at least two strips, said method comprising the steps of bringing the strips into oscillation by means of an excitation field and detecting the resonance frequencies of the strips.

2. Description of the Related Art Including Information Disclosed Under 37 CFR 1.97 and 1.98.

WO-A-93/14478 relates to a method and a device for remote sensing of objects. The objects are marked with at least one label comprising at least one electrical resonant circuit having an induction means and a capacitor means. The resonant circuit is excited to resonance at a resonant frequency, which is detected by the electromagnetic energy transmitted from the resonant circuit. An element of magnetic material having a varying permeability is inductively coupled to said induction element. The resonant frequency of the resonant circuit is affected by the permeability of the element of magnetic material, and this element of magnetic material is exposed to an external and spatially heterogeneous magnetic bias field through which the permeability of the element of magnetic material is controlled.

In the Swedish patent application No 9401449-5, which has not been published yet, there is shown a method of detecting labels with amorphous magneto-elastical strips, said strips being arranged in each label with a certain angular displacement between each other. According to the description of said patent application the following steps are taken in order to detect a label, having an unknown combination of angles. The elements in the label are forced into self-oscillation, their resonance frequencies thereby being detectable. The resonance frequency of an element or a strip is a function of the magnetic field or the magnetizing field strength exposing the element, and hence the magnetic field exposing each element may be determined. It should be noted that the magnetic field is a projection of the actual magnetic field along the element length extension; said magnetic field thereby constituting a component of the actual magnetic field.

There is no way of knowing beforehand which of the strips that belong to each respective label, and hence every possible combination of strips that could form a label must be tested, and for any such combination all angles must be searched so as to find out whether the combination in question constitutes a real label, i.e. a correct combination of strips forming a certain code.

Therefore, all possible combinations of magnetic field components are computed in a calculating unit. Possible combinations are determined by the predetermined sets of angles. Every component pair is used to put together a possible, actual magnetic field vector. Every possible combination provides several magnetic field vectors, and taken together the number of possible magnetic field vectors becomes large. In other words, all possible differential angles between all code strips in a label are computed and matched against each other with respect to a projected magnetizing field strength H.

All elements in a label are exposed to the same H-vector, and therefore each correct code combination among all the determined ones should give the same H-vector value. Every combination of codes or angles giving the same H-vector therefore may constitute a real label combination.

The above method is then repeated with different magnetic field conditions so as to filter out any incorrect (i.e. not real) combinations. Every new condition (strength, gradient, or direction) means several conditions that must be fulfilled for the combination in question to be correct. After a number of repetitions only the correct (real) codes remain, all labels present in the detection zone, even multiple ones with identical code sets, thereby being detected.

In the method described in said patent application every single decoding requires a substantial amount of calculation work, which must be repeated numerous times so as to obtain an accurate detection, and this is particularly true if the number of labels in the detection zone is large.

BRIEF SUMMARY OF THE INVENTION

It is an object of the present invention to substantially reduce the need for heavy and repetitive calculations for every decoding in order to achieve an accurate identification of the labels, and instead to be able to register the strips belonging to each label in just a few detection operations, preferably only one detection operation.

Another object of the invention is to provide a simultaneous detection of the angular relations between the strips within each label, thereby identifying the code for each label.

The objects mentioned above are according to the invention achieved by a method, having the features of the characterizing parts of the appended claims.

BRIEF DESCRIPTION OF THE SEVERAL VIEWS OF THE DRAWING(S)

The invention will now be described with reference to the accompanying drawings, in which:

FIG. 1 is a frequency diagram for the amorphous magneto-elastical strips in a label, FIG. 2 is a schematic illustration of two adjacent strips in a label, FIG. 3 is a schematic view of two strips being adjacently arranged in a label but angularly displaced in relation to each other, FIG. 4 is a diagram showing the variation of the magneto-elastical coupling factor as a function of the magnetic field H, FIG. 5 is an illustration of the variation in time of the signal from a strip, the frequency modulation as well as the amplitude modulation originating from a modulating bias field.

The method according to the invention will be disclosed in more detail in the following by a stepwise disclosure of the considerations behind the invention as defined in the claims.

DETAILED DESCRIPTION OF THE INVENTION

Every label is presumed to contain at least two, preferably four or more, amorphous magneto-elastical strips, which are arranged in the vicinity of each other in the label and which preferably are oriented in predetermined angles in relation to each other. These angles represent a predetermined code, for instance referring to an article with a given price or of a certain nature. The amorphous magneto-elastical strips have such a property known per se, that their resonance frequencies are changed under the influence from a magnetic field.

Figure 1:
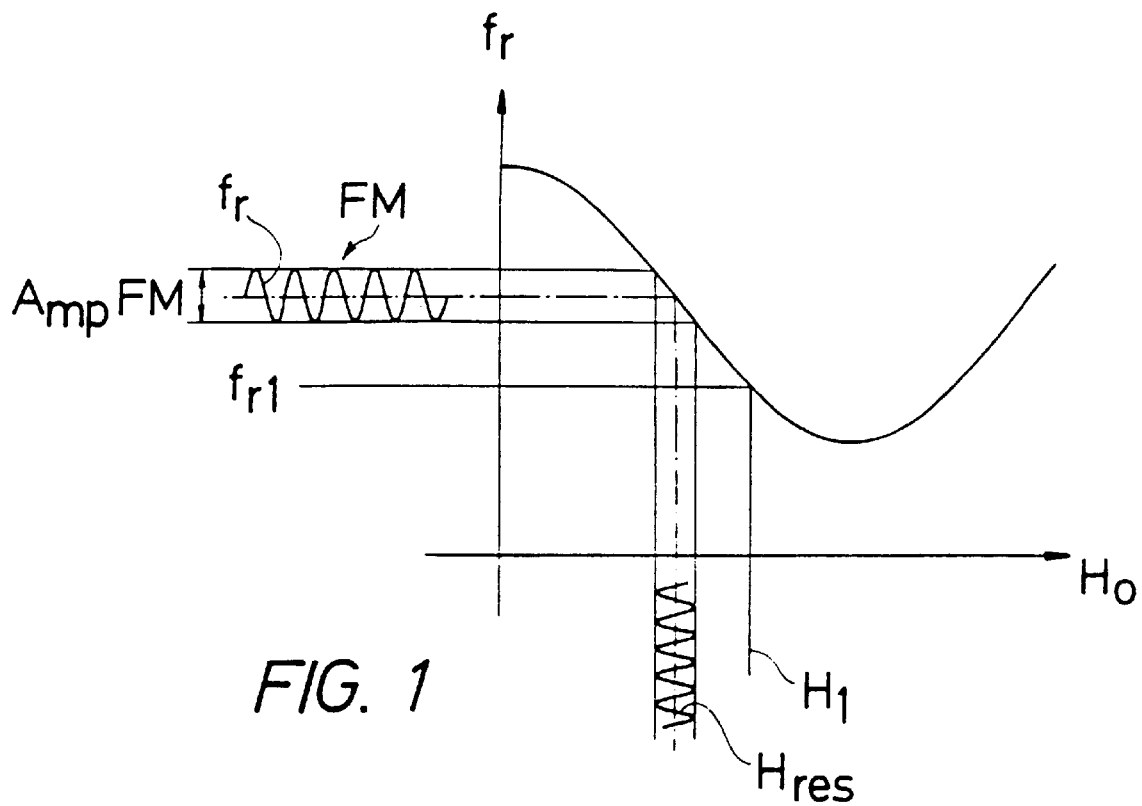

Every strip has a known frequency curve, as illustrated in FIG. 1. The x-axis represents the magnetic bias field H, and the y-axis represents the strip resonance frequency in a magnetic bias field. The magnetic bias field in the detection zone is a static magnetic field, which however may be varied to have different field strength and/or direction in different parts of the detection zone. If a strip is brought into oscillation by a static magnetic field $H_1$ along the strip length extension, the strip resonance frequency will become a constant frequency $f_{r1}$, as schematically shown to the left in FIG. 1.

Figure 2:
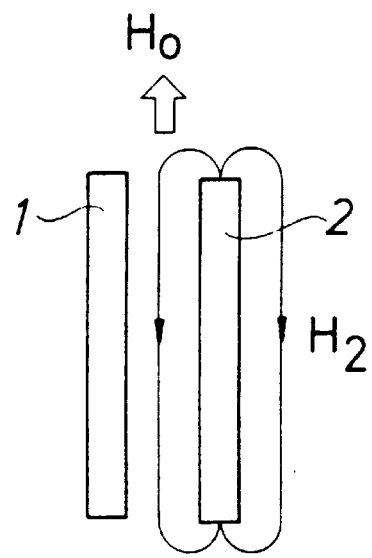

In FIG. 2 two strips 1 and 2 are schematically illustrated as being adjacently arranged in a label. According to the present invention the strips are constituted by amorphous magneto-elastical strips, preferably provided with different mass loads. For instance, strip 1 is a so-called 0-mg strip, i.e. a strip without any weight loads at its ends, and the strip 2 is a 12-mg strip, i.e. a strip being provided with 12-mg weights at its respective ends. In the figure the strips 1 and 2 are shown at a certain distance from each other and in parallel to each other, said strips, however, in reality being arranged sufficiently close to each other or on top of each other so as to achieve a high magnetic coupling factor between the strips.

The following results are achieved by initially presuming that the strip 1 is constituted by an amorphous magneto-elastical strip, while strip 2 is constituted by a soft iron core, both strips simultaneously being exposed to a static magnetic bias field $H_0$. Strip 1 is influenced by a static magnetic field $H_1$, said magnetic field, however, being less than $H_0$, since the magnetic field $H_2$ of strip 2 is acting in the opposite direction as compared to $H_0$, the magnetic field thereby being reduced to $H_1$. However, the magnetic bias field is still static, and the resulting resonance frequency of strip 1 is illustrated in FIG. 1 at $H_1$ and $f_{r1}$, respectively.

In practice strip 2 is not constituted by a soft iron core but is rather an amorphous magneto-elastical strip like strip 1, and hence a modified result is obtained. A resonating magneto-elastical strip exhibits a strong variation of a surrounding magnetic field. (This variation is utilized for detecting the strip resonance by means of detection coils.) The strip 2 is magnetized by the bias field and hence develops a magnetic field $H_2$ of its own, said magnetic field being opposed to the bias field $H_0$. In addition, the strip 2 is brought into oscillation under the influence from an excitation field, its magnetic field therefore also oscillating with the strip resonance frequency. Hence, the magnetic field influencing strip 1 is not a static magnetic field but an oscillating magnetic field $H_{res}$, as indicated in FIG. 1 ($H_{res} = H_0 + H_2$).

The resonance frequency of strip 1 is frequency modulated by the oscillating bias field $H_{res}$, as schematically illustrated in the upper left part of FIG. 1. The oscillation of strip 1 therefore occurs around a mean frequency but with a frequency modulation FM, the modulating frequency of which directly corresponds to the resonance frequency of strip 2, and with a modulating amplitude AmpFM, corresponding to the amplitude of the varying H-field.

The relations described above are used according to the invention to decide during one single detection which ones of the detected strips belonging to each respective label. This is illustrated by the following detection result in table form, said results originating from a fictive example with three labels in a detection zone, each label comprising two amorphous magneto-elastical strips; one 0-mg strip (strip 1) and one 12-mg strip (strip 2). The detected values are presumed to be the following:

| | Strip 1 (0-mg strip) | | | | Strip 2 (12-mg strip) | | |
|---|---|---|---|---|---|---|---|
| | fr | FM | AmpFM | | fr | FM | AmpFM |
| A | 40 | 20 | 3 | D | 11 | | |
| B | 38 | 15 | 2 | E | 20 | | |
| C | 25 | 11 | 4 | F | 15 | | |

In the table above the frequency modulation (FM) and the amplitude (AmpFM) for the 12-mg strips (strips D, E, and F) have been omitted. Obviously a mutual influence between strips 1 and 2 occurs, FM and AmpFM values for the strips D, E, and F therefore also being detected, but these values have been omitted out of clarity reasons, since the study only intends to describe the influence from strip 2 on strip 1.

It appears from the table above that a mean resonance frequency of 40 kHz for a strip (strip A) has been detected, said resonance frequency being frequency modulated with the modulating frequency 20 kHz and with the amplitude 3 kHz. The modulating frequency 20 kHz can only originate from an adjacent strip, which mean resonance frequency is 20 kHz. This particular mean resonance frequency has been detected for strip E. The conclusion is that the strips A and E are arranged in the vicinity of each other, strips A and E in other words being resident in one and the same label. Corresponding analyses with respect to the rest of the strips thus result in the strips C and D being in the same label, and the strips B and F being in the same label.

The reasoning described above obviously may be carried out for all strips in a label, regardless whether the number of strips is two or more, and for all labels present in the detection zone, regardless of their numbers.

The method according to the invention thus renders it possible to detect labels present in a detection zone influenced by a magnetic bias field, each of said labels comprising at least two amorphous magneto-elastical strips, the method according to the invention being characterized in that the resonance frequencies of all strips are detected, at the same time as the modulating frequency of each strip is detected, and in that any strip with a detected resonance frequency corresponding to a detected modulating frequency of another strip is registered as being associated with the same label.

In the embodiment described above the strips are shown arranged in parallel to each other in the label. This is not the case for such labels, where the label code is determined by a unique angular displacement between the strips. For such labels the information provided by the detection of the strips belonging to each respective label is not enough to identify the label-specific code, unlike the case with binary-coded labels. However, the present invention renders it possible during one single detection operation to identify also the code for each respective label in a way described below.

Figure 3:
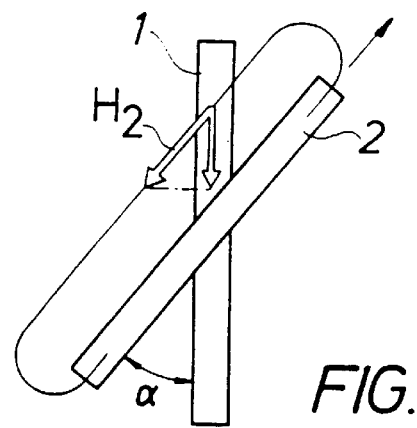

FIG. 3 schematically illustrates two strips 1 and 2, which are adjacently arranged in a label but with a certain angular displacement in relation to each other. The influence from the magnetic field $H_2$ on strip 1 varies with the angle a between strips 1 and 2. The oscillating magnetic field $H_2$ of strip 2 thus influences strip 1 with a component in a right-angled projection on strip 1. The modulating amplitude decreases with increasing α, since the magnetic coupling is reduced. The FM-frequency, however, remains coupled to the resonance frequency of strip 2. Consequently, the modulating amplitude reaches its maximum, when the strips are parallel, and decreases in direct dependency of the angular displacement between the strips. Hence, the detected modulating amplitude is representative for the angular displacement between the strips and at the same time significative for the element code. Since the modulating amplitude is detected together with the mean frequency and the frequency modulation, the present invention hence renders it possible in principal to completely identify the labels in one single detection operation.

Figure 4:
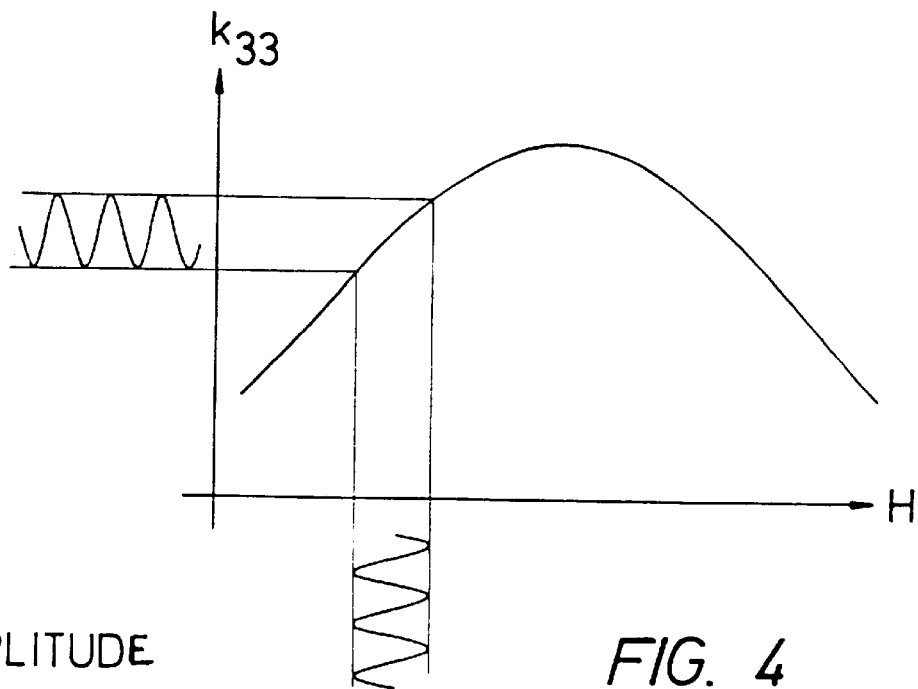
Figure 5:
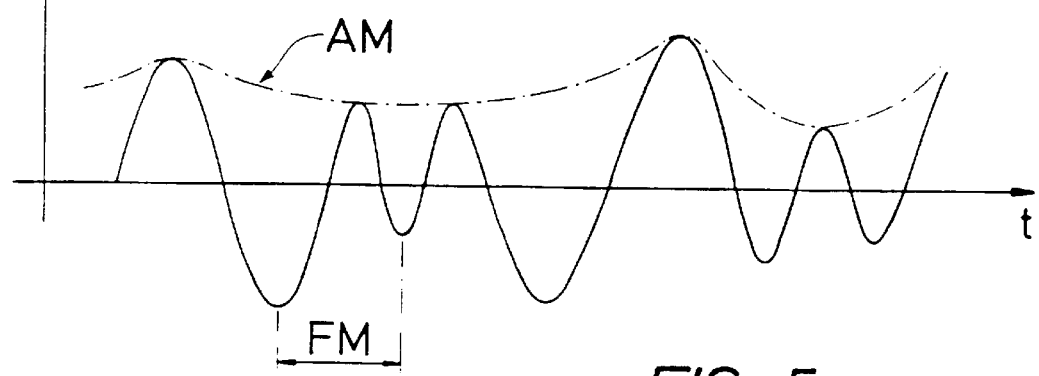

From the graph shown in FIG. 4 it appears how the magneto-elastical coupling factor $k_{33}$ varies in dependency of the magnetic field H. The coupling factor decides the signal strength of the strip. Since the magnetic field H is modulated, the magneto-elastical coupling factor $k_{33}$ of the strip is modulated too, said strip thereby undergoing an amplitude modulation corresponding to the modulating bias field. This is illustrated in FIG. 5, where the y-axis represents the amplitude of the strip signal and the x-axis represents the time. It appears from the figure that both the frequency modulation and the amplitude modulation are coupled to the modulation of the bias field.

As a result, the frequency modulation as well as the amplitude modulation may be utilized in the detection method according to the invention.

Consequently, the invention provides a rational way of detecting labels, which are present in a magnetic detection zone and which are coded through the use of amorphous magneto-elastical strips. The detection according to the invention is possible regardless of the structure of the code, for instance binary coding or a code formed by mutual angular displacements of the strips, such as in the example described above. When it comes to binary coding, certain labels may exist with only one strip. However, the invention is applicable also in such cases. Labels containing just one strip are indicated by the lack of modulation from the strip.

The method according to the present invention is not aimed at completely replacing the method mentioned in the introduction according to the Swedish patent application No. 9401449-5; on the contrary, both methods may be used together, thereby complementing each other. Even a coding where the relative positions between the strips form codes, or where the code is formed by a combination of position and angle, is within the scope of the present invention.

I claim:

1. A method of detecting labels present in a detection zone and exposed to a magnetic bias field in said zone, each label comprising a set of amorphous magneto-elastical strips, said method comprising:

bringing the strips into oscillation by means of an excitation field; and detecting resonance frequencies of the strips;

detecting a frequency modulation of the resonance frequency of each strip; and registering any strip, whose resonance frequency is frequency modulated by a frequency corresponding to the resonance frequency of another strip, as belonging to the same label as said other strip.

2. A method according to claim 1, further comprising:

detecting an amplitude modulation of the resonance frequency of each strip; and converting in a calculating unit the amplitudes of said amplitude modulation for all the strips belonging to one label to angular values, which are representative of the code of the label.

\* \* \* \* \*